US012705324B2

(12) United States Patent
Shetty et al.

(10) Patent No.: US 12,705,324 B2

(45) Date of Patent: Aug. 11, 2026

(54) METHODS AND SYSTEMS FOR ENHANCED KYC FRAUD REDUCTION

(71) Applicant: Mastercard International Incorporated, Purchase, NY (US)

(72) Inventors: Kaushal Shetty, O'Fallon, MO (US); Devanshu Bhardwaj, Hisar (IN); Priya Kadam, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 19/010,354

(22) Filed: Jan. 6, 2025

(65) Prior Publication Data

US 2026/0195433 A1 Jul. 9, 2026

(51) Int. Cl.

| | |
|---|---|
| ***G06F 21/32*** | (2013.01) |
| ***G06N 20/00*** | (2019.01) |
| ***G06Q 20/38*** | (2012.01) |
| ***G06Q 20/40*** | (2012.01) |

(52) U.S. Cl.

CPC ............. *G06F 21/32* (2013.01); *G06N 20/00* (2019.01); *G06Q 20/3829* (2013.01); *G06Q 20/40145* (2013.01); *G06Q 20/4016* (2013.01)

(58) Field of Classification Search

CPC .... G06F 21/32; G06N 20/00; G06Q 20/3829; G06Q 20/40145; G06Q 20/4016

USPC ........................................................... 705/75

See application file for complete search history.

(56) References Cited

U.S. PATENT DOCUMENTS

| | | | | |
|---|---|---|---|---|
| 10,075,437 | B1 * | 9/2018 | Costigan | H04L 9/006 |
| 2018/0012003 | A1 * | 1/2018 | Asulin | G06F 21/36 |
| 2019/0130410 | A1 * | 5/2019 | Nicoletti | G06Q 20/40145 |
| 2020/0110865 | A1 | 4/2020 | Wu et al. | |
| 2022/0353083 | A1 | 11/2022 | Agrawal et al. | |
| 2022/0369106 | A1 | 11/2022 | Turgeman et al. | |

(Continued)

FOREIGN PATENT DOCUMENTS

| | | |
|---|---|---|
| KR | 1020190041084 A | 4/2019 |

OTHER PUBLICATIONS

How Passkeys Work, retrieved from https://web.archive.org/web/20241217165443/https://www.passkeycentral.org/introduction-to-passkeys/how-passkeys-work, archive date of Dec. 17, 2024, 5 pages (Year: 2024).*

(Continued)

*Primary Examiner* — James D Nigh

(74) *Attorney, Agent, or Firm* — Hovey Williams LLP

(57) ABSTRACT

A system and method for user validation via an identity provider computing device, including a processor and memory device, communicably coupled with a user computing device associated with a user. The identity provider computing device receives a signal associated with a private Fast Identity Online (FIDO) key from the user computing device, verifies that the signal associated with the private FIDO key corresponds to a public FIDO key stored on the memory device, receives data regarding behavioral biometrics sensed by the user computing device, and inputs variables based on the received data into a trained machine learning (ML) model. The ML model outputs a confidence score based on the variables, and the computing device determines if the confidence score satisfies validation criteria. Based on the determination, a notification of whether the user is fraudulent is output to the user computing device and/or a computing system of a service provider.

20 Claims, 6 Drawing Sheets

(56) References Cited

U.S. PATENT DOCUMENTS

| | | | | |
|---|---|---|---|---|
| 2022/0417020 | A1* | 12/2022 | Gomi | H04L 9/321 |
| 2023/0033192 | A1* | 2/2023 | Sutherland | H04L 9/083 |
| 2023/0140665 | A1* | 5/2023 | Popa | H04L 63/0861<br>726/4 |
| 2024/0097916 | A1 | 3/2024 | Kaehler | |
| 2024/0248971 | A1* | 7/2024 | Rao | G06F 21/34 |
| 2024/0430247 | A1* | 12/2024 | Singh | H04L 63/08 |
| 2025/0106261 | A1* | 3/2025 | Sridhar | H04L 63/1416 |
| 2025/0307365 | A1* | 10/2025 | Huff | G06F 21/32 |

OTHER PUBLICATIONS

Liang et al. Behavioral Biometrics for Continuous Authentication in the Internet of Things Era: An Artificial Intelligence Perspective, IEEE Internet of Things Journal, IEEE Internet of Things Journal, vol. 7, No. 9, Sep. 2020, pp. 9128-9143 (Year: 2020).*

Introduction to Passkeys, retrieved from https://web.archive.org/web/20241224223931/https://www.passkeycentral.org/introduction-to-passkeys/, Dec. 24, 2024, 3 pages (Year: 2024).*

Karim et al. "Online Banking User Authentication Methods: A Systematic Literature Review", IEEE Access vol. 12, 2024, Jan. 4, 2024, pp. 741-757 (Year: 2024).*

Piugie, "Performance and security evaluation of behavioral biometric systems", Cryptography and Security [cs.CR]. Normandie Université, 2023, submitted Mar. 14, 2024, 203 pages (Year: 2024).*

"Risk-based Authentication", retrieved from https://web.archive.org/web/20241225021505/https://www.pingidentity.com/en/resources/identity-fundamentals/authentication/risk-based-authentication.html, Dec. 25, 2024, 16 pages (Year: 2024).*

Papaioannou et al. "A Survey on Quantitative Risk Estimation Approaches for Secure and Usable User Authentication on Smartphones", Sensors 2023, 2979, Mar. 9, 2023, 34 pages (Year: 2023).*

International Search Report and Written Opinion for PCT Application No. PCT/US2025/058526 (Dated Apr. 23, 2023).

* cited by examiner

STORAGE
DEVICE
310
300
STORAGE
INTERFACE
308
PROCESSOR
302
MEMORY
304
COMM.
INTERFACE
306
TO/FROM
REMOTE
DEVICE

METHODS AND SYSTEMS FOR ENHANCED KYC FRAUD REDUCTION

BACKGROUND OF THE INVENTION

Payment companies must be aware of and comply with the most current laws and regulations of each country or region in which they operate. Compliance can involve a variety of different factors in both the origination and destination countries, such as cross-border payment processing and data transfer, anti-money laundering (AML) laws, Know Your Customer (KYC) requirements, Payment Card Industry Data Security Standards (PCI DSS), and sanctions laws. Failure to do so can result in significant fines, reputational damage, and loss of business.

Know Your Customer (KYC fraud is a type of financial crime that involves manipulating or bypassing KYC protocols to obtain financial gain. KYC protocols can include sets of practices that financial institutions use to verify customer identities and prevent financial crimes. KYC fraud can involve: creating fake identities, stealing someone's identity, using manipulated documents, and providing false or misleading information during the identity verification process.

The existing landscape of KYC processes faces challenges related to traditional approaches, making them susceptible to fraud. Traditional methods often lack the ability to provide a holistic and dynamic verification process, leaving room for fraudulent attempts.

This background discussion is intended to provide information related to the present invention which is not necessarily prior art.

SUMMARY OF THE INVENTION

Embodiments of the current invention address one or more of the above-mentioned problems and provide a distinct advance in the art of user validation. Specifically, the present invention aims to overcome these challenges by introducing Fast Identity Online (FIDO)-based authentication and machine learning (ML) integration to establish a resilient and innovative approach to user validation. Specifically, in one or more embodiments, a system for user validation includes an identity provider computing device. The identity provider computing device includes a processor and memory device and is communicably coupled with a user computing device associated with a user. The identity provider computing device receives a signal associated with a private Fast Identity Online (FIDO) key from the user computing device, verifies that the signal associated with the private FIDO key corresponds to a public FIDO key stored on the memory device, receives data regarding behavioral biometrics sensed by the user computing device, and inputs variables based on the received data into a trained machine learning (ML) model. The ML model outputs a confidence score based on the variables, and the computing device determines if the confidence score satisfies validation criteria. Based on the determination, a notification of whether the user is fraudulent is output to the user computing device and/or a computing system of a service provider.

In yet another embodiment, a user computing device for user validation with a service provider may include a display screen, an input device configured to receive input from a user, at least one memory device, and one or more processors. The processors may be programmed to individually or collectively send a signal associated with a private Fast Identity Online (FIDO) key to an identity provider computing device for comparison by the identity provider computing device against a public FIDO key, provide a fillable form on the display screen, and receive behavioral biometric data sensed as the user fills out the fillable form via the input device. The processors may also be programmed to output one or more variables based on the behavioral biometric data to a trained machine learning (ML) model, which outputs a confidence score based on the one or more variables, and also display on the display screen a validation determination of whether the user is considered fraudulent based on evaluation of the confidence score using one or more validation criteria. Furthermore, the validation fails if the private FIDO key does not match the public FIDO key.

In still another embodiment, non-transitory computer-readable storage media having computer-executable instructions for user validation is provided. When executed by at least one processor, the computer-executable instructions cause the at least one processor to validate a user computing device via FIDO-based key pairs, receive from the user computing device details input by a user into a form on the user computing device, and receive data regarding behavioral biometrics sensed by the user computing device. At least some of the behavioral biometrics are sensed as the user inputs the details into the form. Furthermore, when executed by the at least one processor, the computer-executable instructions cause the at least one processor to also determine a confidence score based on the behavioral biometrics data, and output to the user computing device and/or a computing system of a service provider a validation determination of whether the user is fraudulent based on comparison of the confidence score against one or more validation criteria.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
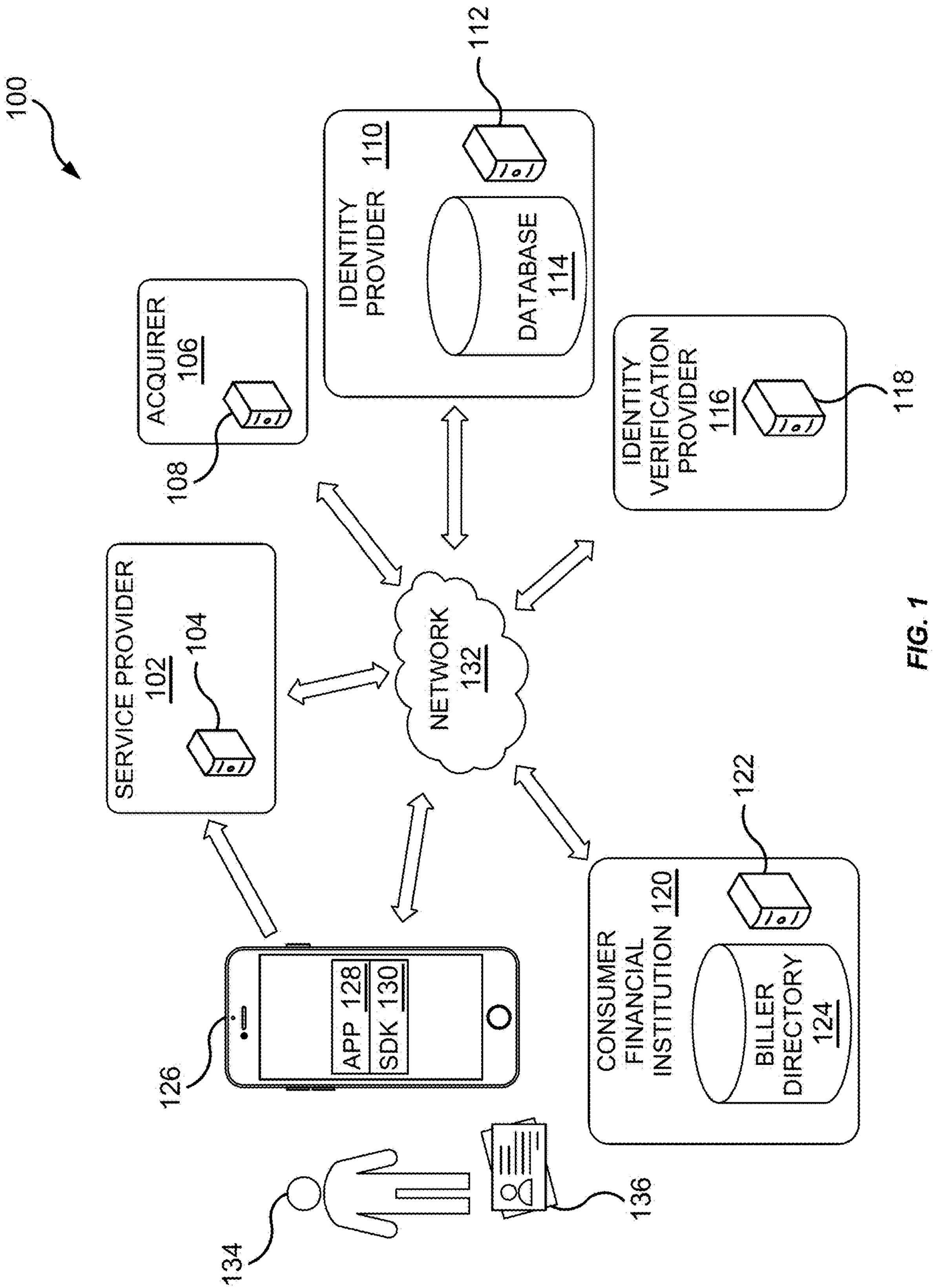
FIG. 1 is a block diagram of a user validation system in accordance with one or more embodiments of the present disclosure.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Current Know Your Customer (KYC) processes for in-person user validation generally include the following method operations. First a user visits a center or institution, fills offline forms, and provides hard copies of documents for identity and/or proof of address. A live photograph of the user is obtained and biometrics verification such as fingerprinting is performed by the center or institution. This is inconvenient for users and the cost to scale this process is expensive. For online KYC processes of user validation, a user generally creates an online account, completes an online form, and uploads documents for identity and address proof. Unfortunately, such user-provided information can be filled and/or uploaded using generative AI, making this process less reliable and secure than in-person methods. A live photo or video verification may be performed by the user from the user's device, and a second-factor authentication may be performed via SMS/email OTP or phone call. Deepfake content can break the real-time verification (e.g., live photo, video, phone call) and static OTP is prone to phishing, pharming, and social engineering attacks.

Embodiments of the present invention provide a system and method for user validation that overcomes the disadvantages described above by introducing FIDO, machine learning (ML), and issuer authentication to establish a resilient and innovative approach to user validation.

Exemplary System

FIG. 1 depicts an exemplary system 100 for validating digital identities of users to streamline, aggregate, and simplify user interactions with a service provider and/or payments associated with service providers. Although the system 100 is depicted in one arrangement, other embodiments may include the elements of the system 100 (and/or other elements) arranged otherwise depending on, for example, relationships between users and identity providers, particular types of devices utilized with digital identities, relationships between users and service providers, privacy requirements, and the like.

Referring to FIG. 1, the system 100 may generally include a service provider 102 (also referred to as a "relying party"), an acquirer 106 associated with the service provider 102, an identity provider 110, an identity verification provider 116, a consumer financial institution 120, and a user computing device 126. Each of the service provider 102, the acquirer 106, the identity provider 110, the identity verification provider 116, and the consumer financial institution 120 may include, and/or may be implemented in, a computing system, such as computing systems 104, 108, 112, 118, and 122, respectively. Each of the computing systems 104, 108, 112, 118, and 122 may include, for example, a desktop computer, a laptop or tablet computer, an application server, a database server, a file server, or the like, or combinations thereof, configured to execute or run one or more applications and/or provide one or more computing services. In addition, each of the computing systems 104, 108, 112, 118, and 122 may include and/or work in conjunction with application servers, database servers, file servers, gaming servers, mail servers, print servers, or the like, or combinations thereof. Furthermore, each of the computing systems 104, 108, 112, 118, and 122 may include a plurality of servers, virtual servers, or the like, or combinations thereof.

The user computing device 126 and the computing systems 104, 108, 112, 118, and 122 may be coupled to (and in communication with) one or more networks, such as a communication network 132. The communication network 132 may provide wired and/or wireless communication between the user computing device 126 and the computing systems 104, 108, 112, 118, and 122. Each of the user computing device 126 and the computing systems 104, 108, 112, 118, and 122 may be configured to send data to and/or receive data from the communication network 132 using one or more suitable communication protocols, which may be the same communication protocols or different communication protocols as one another.

The communication network 132 may include one or more telecommunication networks, nodes, and/or links used to facilitate data exchanges between one or more devices and may facilitate a connection to the Internet for devices configured to communicate with communication network 132. The communication network 132 may include local area networks, metro area networks, wide area networks, cloud networks, the Internet, cellular networks, plain old telephone service (POTS) networks, and the like, or combinations thereof. The communication network 132 may be wired, wireless, or combinations thereof and may include components such as modems, gateways, switches, routers, hubs, access points, repeaters, towers, and the like.

In the system 100, consumer financial institution 120 (also referred to as an "issuer") may issue a financial account and an associated transaction card (e.g., a credit card, debit card, etc.) to the user 134. The user 134 may use the transaction card to tender payment for a purchase from the service provider 102. In an example embodiment, the service provider 102 is typically associated with goods and/or services that are offered for sale and are sold to the user 134. The service provider 102 includes, for example, a physical location and/or a virtual location. A physical location includes, for example, a brick-and-mortar facility, etc., and a virtual location includes, for example, an Internet-based storefront.

To accept payment with the transaction card, the service provider 102 must normally establish an account with a financial institution that is part of the system 100. This financial institution is usually called the "merchant bank," the "acquiring bank," or the acquirer 106. Typically, when the user 134 presents payment for a purchase with, for example, the transaction card, the service provider 102 requests authorization from the acquirer 106 for the amount of the purchase. The request may generally be performed using a point-of-sale (POS) terminal, such as the computing system 104, that reads the user's 134 account information from the transaction card. For example, the computing system 104 may read the account information from embossed characters, a magnetic stripe, or a chip (either via direct contact or wirelessly) on the transaction card, for example, via a card reader (not shown). The computing system 104 may communicate electronically with the computing system 108 of the acquirer 106 to transmit the account information thereto. Alternatively, the acquirer 106 may authorize a third party to perform transaction processing on its behalf. In this case, the computing system 104 will be configured to communicate with the third party. Such a third party is usually called a "merchant processor," an "acquiring processor," or a "third party processor."

The computing system 108 of the acquirer 106 or merchant processor may communicate with the computing device 122 of the issuer 120 to determine whether the user's account is in good standing and whether the purchase is covered by the user's available credit line. Based on these determinations, the request for authorization may be declined or accepted. If the request is accepted, an authorization code may be issued to the service provider 102.

In the example embodiment, the identity provider 110 of the system 100 may generally be associated with providing a digital identity of the user 134 to the service provider 102 in connection with one or more interactions between the user 134 and the service provider 102. As depicted in FIG. 1, the identity provider 110 is shown as a standalone service and/or device of the system 100. It is contemplated, however, that the identity provider 110 may additionally, or alternatively, be incorporated in whole or in part with another party of the system 100, such as, for example, a payment network or a banking institution, etc. Specifically, for example, the identity provider 110 may be incorporated into the Mastercard® payment network or Mastercard®) interchange network and configured to operate as described herein to provide corresponding services to users via and/or in association with the Mastercard® payment network. (MASTERCARD is a registered trademark of Mastercard International Incorporated). The Mastercard® payment network is a set of proprietary communications standards promulgated by Mastercard International Incorporated for the exchange of financial transaction data and the settlement of funds between financial institutions that are members of Mastercard International Incorporated. However, the identity provider 110 may include and/or be associated with alternative of additional interchange networks or transaction card systems without departing from the scope of the disclosure herein. As used herein, financial transaction data can include a unique account number (e.g., a PAN) associated with an account holder or the user 134 using a payment card issued by an issuer (e.g., issuer or consumer financial institution 120), purchase data representing a purchase made by the user 134, including a type of merchant, amount of purchase, date of purchase, and other data, which may be transmitted between any parties of the system 100.

Furthermore, the computing system 112 of the identity provider 110 is configured to interact with the user computing device 126 of the user 134 to receive evidence of the identity of the user 134 to compile a digital identity for the user 134. The computing system 112 may be configured to compile the digital identity for the user 134 after such evidence is received and after the user's identity is verified. The computing system 112 may be configured to store the digital identity in a database, such as the database 114 associated with the identity provider 110. As such, the database 114 may include the user's digital identity and other digital identities for other users, and corresponding certification records therefor (together or separately). In some embodiments, the digital identities and the corresponding certification records may be stored in a block chain data structure, whereby the data structure may include a continually growing list of ordered records (where each record includes a time stamp and a reference or link to a prior record). Alternatively, the digital identities and the corresponding certification records may be stored in any other data structure or system, equivalent or not, that enable the system 100 to function as described herein.

The computing system 112 may be further configured to provision the compiled digital identity for the user 134 to one or more computing devices, such as, for example, the user computing device 126. The digital identity may be provided, by the user 134 (via the user computing device 126, etc.), to one or more relying parties, such as the service provider 102, when requested and/or in connection with transactions between the user 134 and the service provider 102. In this manner, the service provider 102 may be able to and may rely on the digital identity of the user 134 to satisfy, for example, proof of identity and/or know your customer (KYC) requirements for various transactions or other types of interactions requiring user verification. Various methods of providing enhanced evidence of a user's identity for KYC requirements or KYC user validation or verification are later disclosed herein.

The identity verification provider 116 in the system 100 may include an entity storing trusted information representing the identity of the user 134 (and other users), for example, based on records associated with the user 134. For example, the identity verification provider 116 may include a government entity, such as a state department of motor vehicles (DMV), or a customs and border protection agency, either of which may possess record(s) associated with the user 134. The record(s) associated with the user 134 may include biometric information associated with the user 134. For example, a DMV may have a record, identifiable by a driver's license number, which may include a facial image of the corresponding user. The record may comprise or be associated with a driver's license issued by the DMV. It is contemplated that other entities, including, for example, financial institutions, utility providers, medical services entities, telecommunication providers, etc. (and more generally, any entity in possession of biometric information that may be verified to a particular user) may also be identity verification providers in embodiments of the system 100, with each potentially storing different attributes of a user's identity.

As discussed above, the consumer financial institution 120 may be an issuer of a payment account of the user 134 and/or may provide access to the payment account on behalf of an issuer of the account. The consumer financial institution 120 may also provide an account viewing environment and/or a bill payment environment through which the user 134 may pay one or more bills (and/or conduct other financial processes, such as viewing balances, performing transfers, and the like). The account viewing or bill payment environment may include, for example, a web site or software application maintained by the consumer financial institution 120, such as a mobile application 128 operable on the user computing device 126. As described herein, the user 134 may have the user computing device 126 associated therewith. The user computing device 126 may include any device capable of accessing the Internet, as well as the accounting viewing and/or the bill payment environment of consumer financial institution 120.

In one or more embodiments, the consumer financial institution 120 includes or has access to a biller directory 124. The biller directory 124 may store records associated with a plurality of billers, such as the service provider 102.

In the exemplary embodiment, the user computing device 126 and the computing systems 104, 108, 112, 118, and 122 may connect to the communication network 132 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as WiFi, IEEE 802.16 standards such as WiMAX, Bluetooth™, or combinations thereof. In aspects in which the communication network 132 facilitates a connection to the Internet, data communications may take place over the communication network 132 via one or more suitable Internet communication protocols. For example, the communication network 132 may be implemented as a wireless telephony network (e.g., GSM, CDMA, LTE, etc.), a Wi-Fi network (e.g., via one or more IEEE 802.11 Standards), a WiMAX network, a Bluetooth network, etc.

In one or more embodiments, the user computing device 126 may be a mobile computing device, including a camera and a web browser. It is contemplated, however, that the user computing device 126 may be any device, such as a mobile phone, Smartphone, personal digital assistant (PDA), key fob, and/or a computer, such that one or more of the computing systems 104, 108, 112, 118, and 122 are accessible to the user computing device 126 using, for example, the Internet. The user computing device 126 may be interconnected to the Internet through one or more of many interface types including, for example, a network, such as a wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like. The user computing device 126 may be any device capable of interconnecting to the Internet including an Internet connected phone, or any other suitable web-based connectable equipment.

The computing device 126 may generally be associated with the user 134 and includes a mobile application 128. The mobile application 128 may be configured (via executable instructions) to interact with the computing system 112 of the identity provider 110 in connection with requesting, providing, updating, etc. a digital identity of the user 134. Specifically, in the exemplary embodiment, the mobile application 128 includes a software development kit (SDK) 130 associated with the identity provider 110. The SDK 130 may configure the computing device 126 to interact with the computing system 112.

Furthermore, as described herein, the computing device 126 is associated with the user 134 who, in turn, is associated with an identity. The identity of the user 134 may be evidenced by one or more physical documents, such as the physical document 136. The physical document 136 may include, for example, a government issued license (e.g., issued by a state, regional, or federal government). It is contemplated, however, that the physical document 136 may include additional and/or other physical documents for the user 134, such as, for example, a health insurance card, a passport, a government issued identification document, a social security card, a bank statement, an employee ID, a library card, a utility bill, etc. The physical document 136 (and any other physical documents) includes one or more attributes of the user 134 and/or of the identity of the user 134. The one or more attributes distinguishes the user 134, alone or in combination, from one or more other users (not shown). The attributes may include, for example and without limitation, a name of the user 134, a mailing address, a birthdate, contact information (e.g., a phone number, an email address, etc.), a social security number or other government identification number, and/or any other desired attribute of the user 134.

Exemplary Computer Systems

Figure 2:
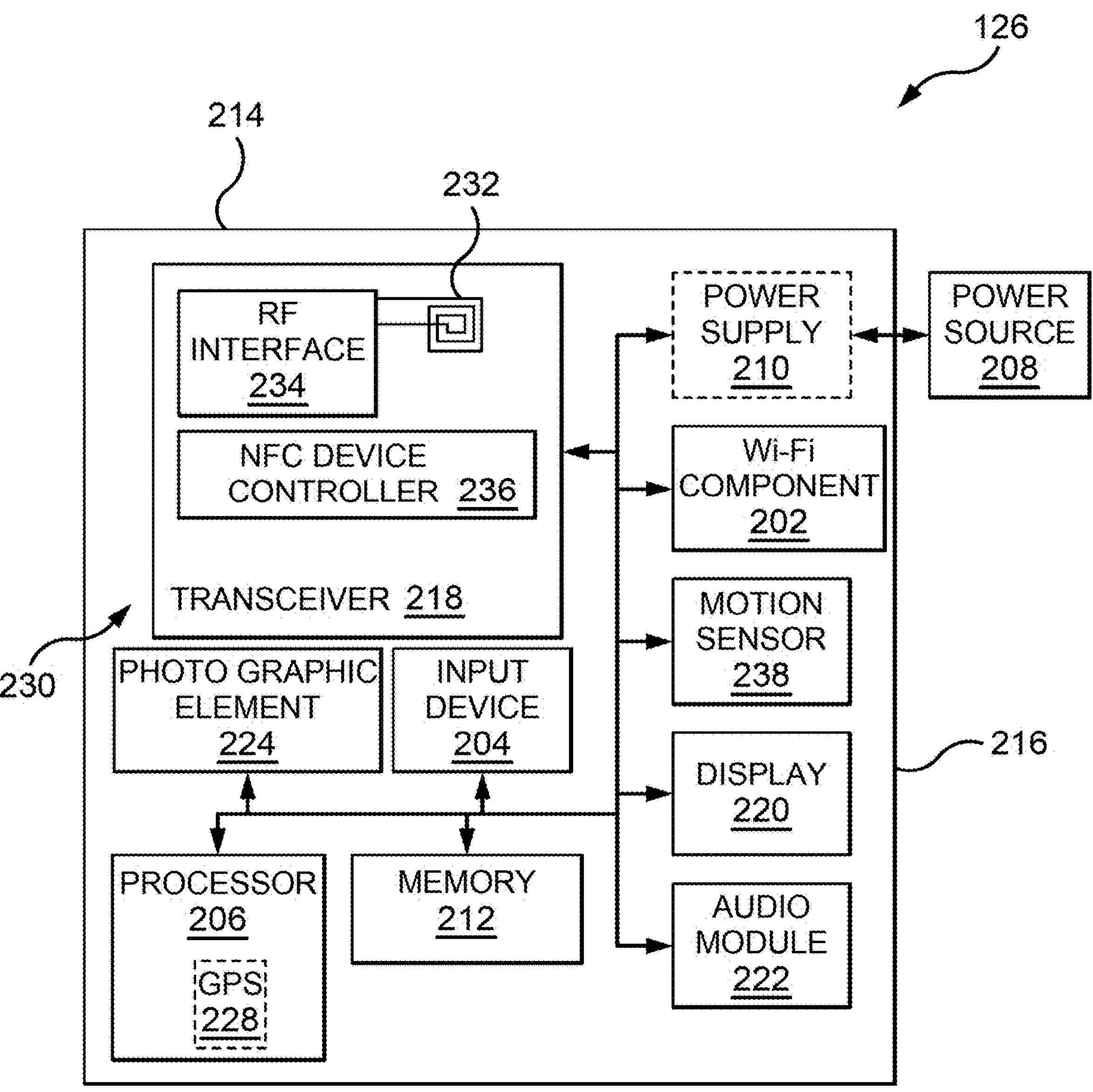
FIG. 2 is a simplified block diagram of an exemplary user computing device of FIG. 1.

FIG. 2 is an example configuration of a user computing system 200, such as the user computing device 126 (shown in FIG. 1) that may be operated by a user, such as the user 134 (shown in FIG. 1). In the exemplary embodiment, the computing system 200 may be a computing device configured to connect wirelessly to one or more of the service provider 102, the identity provider 110, the consumer financial institution 120, the network 132, and any other computing devices.

In the exemplary embodiment, the computing system 200 may generally include a processor 206, a memory device 212, a transceiver 218 (or a wireless communication device), and a photographic element 224. In addition, the computing system 200 may include an integrated Wi-Fi component 202 (e.g., implementing the Institute of Electrical and Electronics/IEEE 802.11 family of standards), an input device 204, a display 220, and an audio module 222. Moreover, the computing system 200 optionally may include an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 may include one or more processing units (e.g., in a multi-core configuration), including one or more digital processing unit(s), specially programmed for executing computer readable instructions. The instructions may be executed within a variety of different operating systems (OS) on the computing system 200, such as UNIX, LINUX, Microsoft Windows®, etc. More specifically, the instructions may cause various data manipulations on data stored in the memory device 212 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 may be any device allowing information such as transaction card data, the executable instructions, and/or other data to be stored and retrieved. The memory device 212 may include one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the system 100 may provide a mechanism for automatically updating the software on the computing system 200. For example, an updating mechanism may be used to automatically update any number of components and their drivers, both network and non-network components, including system level (OS) software components. In some embodiments, the components of the computing system 200 may be dynamically loadable and unloadable; thus, they may be replaced in operation without having to reboot the OS.

A location of the computing system 200 may be obtained through conventional methods, such as a location service (e.g., global positioning system (GPS) service) in the computing system 200, "ping" data that includes geotemporal data, from cell location register information held by a telecommunications provider to which the computing system 200 may be connected, and the like. For example, in one suitable embodiment, an optional GPS chip 228 may be part of or separate from the processor 206 to enable the location of the computing system 200 to be determined.

The Wi-Fi component 202 (broadly, a communication interface) may be communicatively connectable to a remote device such as any of the computing systems 104, 108, 112, 118, and 122. The Wi-Fi component 202 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 212 may be, for example, computer readable instructions for providing a user interface to the user, such as the user 134, via the display 220 and, optionally, receiving and processing input from the input device 204. A user interface may include, among other possibilities, a web browser and a client application, such as the application 128 (shown in FIG. 1), which application may be hosted by the computing system 112 of the identity provider 110. Web browsers may enable users, such as the user 134, to view and interact with media and other information typically embedded on a web page or a website. A client application, such as the application 128 (also referred to as an "app"), may allow the user 134 to interact with a server application, for example, associated with the identity provider 110.

The photographic element 224 may include a camera or other optical sensor and lens combination capable of generating a video signal and capturing an image, iris scan, and the like. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person's presence. For example, the motion sensor 238 may detect when the user 134 moves or raises the user consumer system 200. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the consumer's presence may be detected by detecting motion using the photographic element 224. The motion sensor 238 may include, for example, and without limitation, sensor elements such as a passive infrared sensor, an ambient light sensor, and the like.

In the example embodiment, the display 220 may include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect the presence of the user 134 by detecting that the user 134 has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 132 (shown in FIG. 1) and/or other computing devices (e.g., other mobile devices, the computing systems 104, 108, 112, 118, and 122, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one or more embodiments, the circuitry 230 is hermetically sealed in the housing 214. For example, in one or more embodiments, the circuitry 230 is completely and permanently encased within the housing 214. In other words, the housing 214 and the circuitry 230 are intended to remain as a single, inseparable unit throughout the life of the computing system 200. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 may be fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 may be fabricated from any material that enables the computing system 200 to function as described herein, such as metals, etc.

In one or more embodiments, the transceiver 218 may include an antenna 232. The antenna 232 includes a looped wire configured to transmit radio signals when current flows through the looped wire. The antenna 232 is any size, shape, and configuration that is suitable for transmitting signals as described herein. For example, the antenna 232 may be a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 may be configured to vibrate at a frequency of about 13.56 MHz, which is suitable for use in a near field communication (NFC) system.

In the example embodiment, the antenna 232 may transmit radio signals to and may receive radio signals from other wireless-enabled computing devices, for example, another mobile device, the computing systems 104, 108, 112, 118, and 122, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 232 may function as an NFC component to send and receive signals. The antenna 232 may be configured to transmit radio signals to NFC components positioned within the magnetic field of the antenna 232, such as when the computing system 200 is positioned within a predetermined distance of the computing system 104. Therefore, the magnetic field generated by the antenna 232 may define the active range of the computing system 200. Additionally, the antenna 232 may receive radio signals from NFC components when the antenna 232 is positioned within the magnetic field of the NFC components.

The transceiver 218 also may include a radio frequency (RF) interface 234 and an NFC device controller 236. The RF interface 234 and the NFC device controller 236 may be powered by the power source 208, and in some embodiments, the internal power supply 210 and/or the display 220. In addition, the processor 206 and the memory device 212 may be powered in the same manner. The RF interface 234 may be configured to receive and transmit RF signals through the antenna 232. The NFC device controller 236 may be configured to process the received RF signals and to generate signals to be transmitted by the RF interface 234. The memory device 212 may be configured to store data associated with transmitting and receiving the RF signals. The NFC device controller 236 may be coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
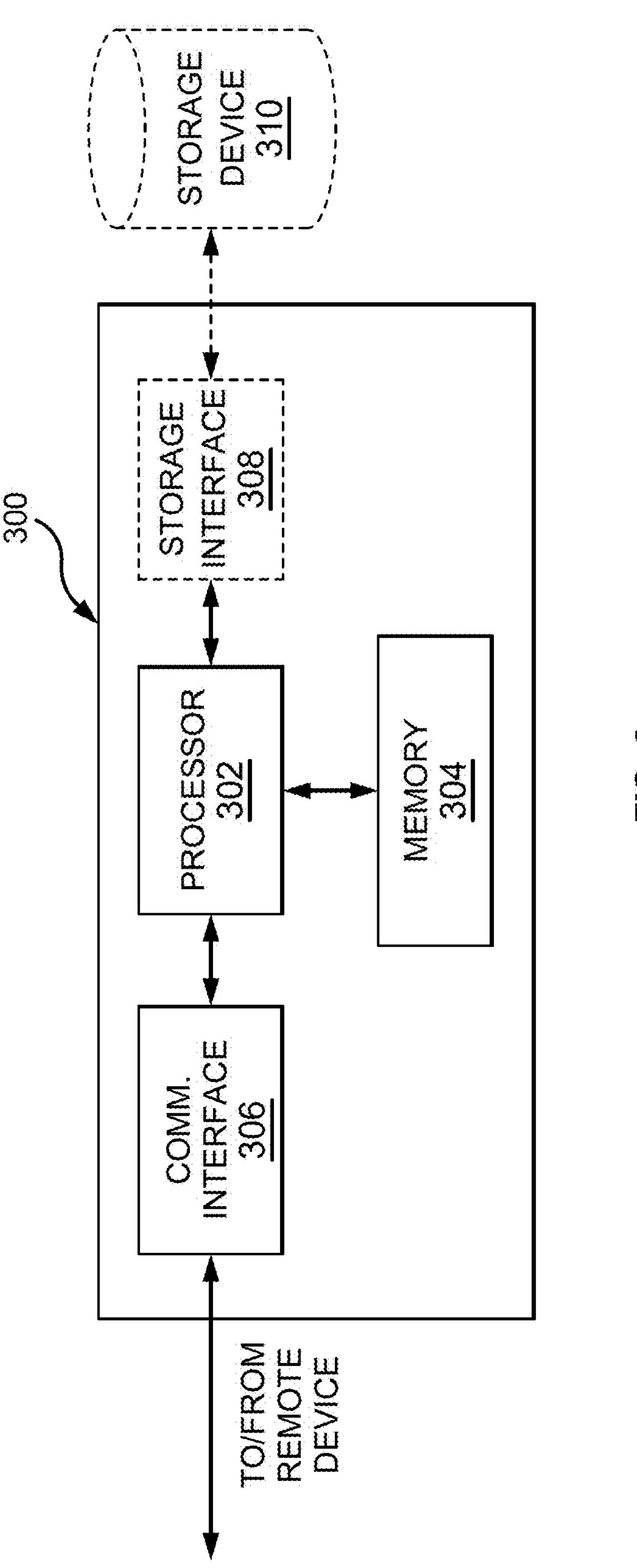
FIG. 3 is an example block diagram of a server system for use with one or more components of the user validation system of FIG. 1.

FIG. 3 is an example configuration of a server system 300. In one or more embodiments, the server system 300 may include, but not be limited to, one or more of the computing systems 104, 108, 112, 118, and 122 (shown in FIG. 1). In the example embodiment, the server system 300 may include a processor 302 (e.g., one or more digital processing unit(s)) for executing instructions. The instructions may be stored in a memory 304, for example. The processor 302 may include one or more processing units (e.g., in a multi-core configuration) for executing the instructions. The instructions may be executed within a variety of different operating systems on the server system 300, such as UNIX, LINUX, Microsoft Windows®, etc. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 302 may be operatively coupled to a communication interface 306 such that the server system 300 can communicate with a remote device such as a user computing system 200 (shown in FIG. 2), one or more of the computing systems 104, 108, 112, 118, and 122, and/or another server system. For example, the communication interface 306 may receive communications from a user computing device 126 via the Internet (FIG. 1).

The processor 302 may be operatively coupled to the storage device 310. The storage device 310 may be any computer-operated hardware suitable for storing and/or retrieving data. In some embodiments, the storage device 310 may be integrated in the server system 300. In other embodiments, the storage device 310 may be external to the server system 300. The storage device 310 may be similar to the databases 114 and 124 (shown in FIG. 1). For example, the server system 300 may include one or more hard disk drives as the storage device 310. In other embodiments, the storage device 310 may be external to the server system 300 and may be accessed by a plurality of server systems. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 may be operatively coupled to the storage device 310 via a storage interface 308. The storage interface 308 may be any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

The memory 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Computer-Implemented Methods

The methods and method operations described herein may be performed via the system 100, the computer system 200, the server system 300, and/or any of the systems described herein. The systems and methods herein may utilize FIDO authentication protocols to establish secure key pairs for user devices, ensuring a strong foundation for user identification. FIDO authentication uses standard public key cryptography techniques to provide phishing-resistant authentication. Specifically, FIDO authentication is a set of open standards that use public key cryptography to replace passwords with more secure methods, such as passkeys, biometrics, and physical security keys. Passkeys may include cryptographic key pairs that are stored on a user's electronic device, such as the computing device 126, to provide a more secure way to authenticate users. Biometrics can include fingerprints or facial recognition. Physical security keys can include smart cards or the like to authenticate users. To use FIDO authentication, a user registers a device such as a computer, mobile phone, or physical security key to a FIDO-compatible service (e.g., identity provider 110). Users are then issued a private key that is unique to each application and stored on their device. Users can sign onto a FIDO-enabled product or service by providing a fingerprint, speaking into a microphone, looking into a camera, or entering a PIN, for example.

In one or more embodiments herein, an issuer authentication framework is provided such that trusted entities issue unique credentials to users and user identities are mapped based on issuer authentication. In one or more embodiments, machine learning enhancement is applied via the system and methods described herein. Specifically, machine learning algorithms are integrated to continuously analyze user behavior during authentication, detecting anomalies or deviations for an additional layer of security during user validation.

One or more embodiments further include multi-issuer authentication, which enables users to authenticate across multiple issuers, creating a network of cross-verified credentials and enhancing overall user trustworthiness. The system and methods described herein may also be configured to address dynamic fraud detection challenges. Specifically, introducing dynamic challenge-response mechanisms during authentication powered by ML algorithms may make it difficult for fraudulent attempts, especially those using deep fake technologies. Furthermore, one or more embodiments of the system and methods herein combine FIDO-based biometric authentication with behavioral biometrics, enhancing the accuracy and reliability of user validation. Integrating FIDO-based authentication with secure hardware elements, as in one or more embodiments herein, may also ensure the integrity of the authentication process. The system and methods herein may also include establishing a trust network based on devices with multiple issuer apps, contributing to building trust and reducing the overall risk of fraudulent activities.

In some example embodiments, one or more of the following variables are utilized for two-factor authentication (2FA) or validation of the user: device switch from previous session (D), session mode(S), speed of navigation ($S_N$), speed of typing ($S_T$), angle of device ($D_A$), tab switching in session ($T_S$), malicious process in background (M), size of active window (W), local timestamp of user (T), number of days since last successful KYC/user validation (N), number of previous successful KYC/user validation done ($N_S$), and period of inactivity during session (P). These variables may be calculated as described below and weighted in accordance with various pre-determined weighting algorithms in order to determine a confidence score. Additionally or alternatively, these variables are weighted via a machine learning (ML) model, which may be trained using a variety of methods and techniques known in the art, such as those provided under XGBoost™ (XGBOOST is a trademark owned by one or more entities unaffiliated with and unsponsored by the present applicant) or sequential ensemble of tree models. However, other ML model training may be used without departing from the scope of the disclosure herein. In some embodiments, in order to obtain training data for the ML model, non-fraud KYC data can be retrieved based on existing in person KYC onboarding processes and collection of meta data therefrom. For each fraudulent KYC, synthetic data generation may be used by creating outliers for each parameter or variable fed into the ML model.

The device switch from previous session (D) may assist in user validation as follows. Generally, a genuine user is unlikely to switch their device frequently. This can be tracked by a binary identifier (Y/N, representing Yes/No, for example) if the device is different from a last session of the user. For example: D=Y,N where Y=flag if device was switched from previous session and N=flag if device was not switched from previous session. The selection of N would tend to weigh in favor of the user being a valid user.

The session mode(S) is indicative of a mode of a session login by the user. Some examples may include logging in via a web browser or logging in via an app. App-based logins are generally considered to be more secure and less prone to attacks due to device-level integration. So, for example, $S=S_1, S_2, \ldots, S_n$, where $S_n$=mode of session login by the user.

The speed of navigation (Sx) is indicative of the speed at which a user moves from one field in a form to another, which may indicate if the user is a genuine user or is a fraudulent user. For example, if the speed is too high, it is more likely to be auto-filled by a deepfake algorithm. On the other hand, if it is filled too slowly, then the user might be switching between tabs/apps, which may also raise suspicion of fraudulent behavior. For example, $S_N=(T_{n+1}-T_n)/T^0$, where $T_{n+1}$=timestamp when the form's n+1th field is made active from inactive, $T_n$=timestamp when the form's nth field is filled completely, and $T^0$ standard time difference between given two consecutive fields taken by a normal human or normal valid user.

The speed of typing ($S_T$) is indicative of a speed at which a user fills a given field in the form. This can be calculated as standard words per minute speed and compared with normal human typing speed. For example $S_T=WPM_u/WPM^0$, where $WPM_u$=words per minute of the user and $WPM^0$=standard words per minute of a human.

The angle of device ($D_A$) is indicative of how a user holds their device (e.g., the user computing device 126). That is, specific users have a specific way of holding their user computing devices, particularly when operating a mobile device such as a phone, tablet, or laptop. This data can be retrieved from gyroscopic sensors of their devices. Any sudden shift in device angle from the usual may indicate fraudulent behavior. Thus, in some examples, $D_A$=angle of device in radians.

The tab switching in session ($T_S$) is indicative of a number of tab switches. Genuine users are unlikely to switch tabs during a form filling session. The number of tab switches can be calculated based on a combination of idle time and number of background apps, and compared with a standard threshold. Significant deviation may indicate a fraudulent behavior. For example, $T_S=TS_u-TS^0$, where $TS_u$=number of tab switches by the user, and $TS^{O}$=number of standard tab switches done by a normal human or a typical user.

The malicious process in background (M) is indicative of detecting that a malicious process is running in the background on a user device (e.g., the user computing device 126) during a user validation process, which can indicate a fraudulent activity. This may be especially useful for app-based login. For example, M=Y, N where Y=flag yes if device has malicious process running in the background, and N=flag no if device does not have malicious process running in the background.

The size of active window (W) is indicative of a size of an active window used for KYC (or other user validation) and login on the user's device (e.g., the user computing device 126), which can help in determining if the user's device has any other windows opened simultaneously. Any non-standard window size and any deviation from a user's general window usage may indicate a fraudulent activity. For example, $W=w \times h$, where w=width of window and h=height of window.

The local timestamp of user (T) is indicative of a current local time of usage of the user device (e.g., the user computing device 126). Users generally have predictable times of usage when it comes to recurring KYC data or other user validation techniques. Any deviations may indicate fraudulent behavior, such as phishing. For example, T=user's local timestamp of login.

The number of days since last successful KYC/user validation (N) is indicative of how many days since the user validation process (e.g., KYC) resulted in the confidence score being high enough or otherwise satisfactory such that the user was validated as a non-fraudulent user. That is, the longer the gap between consecutive KYC successful user validation, the higher the chances of fraud. A frequent KYC process with smoother user experience may reduce the chances of fraud. A user is also likely to perform KYC at a regular interval, and a deviation in pattern may indicate a fraudulent behavior. For example, $N=D_t-D_{t-1}$, where $D_t$=date of last KYC and $D_{t-1}$=date of KYC prior to last one.

Similarly, the number of previous successful KYC/user validation done ($N_S$) is indicative of an ongoing count of how many past successful KYC or other such similar user validations were performed by the user. That is, an assumption may be made that a user who has performed a greater number of successful KYC validations in the past is likely to be less fraud susceptible. For example, $N_S=N/N_T$, where N=number of successful KYC attempts and $N_T$=total number of KYC attempts. A higher percentage of successful KYC user validations out of the total KYC user validation attempts indicates a higher chance that the user is not fraudulent.

The period of inactivity during session (P) is indicative of the likelihood of a fraudulent user based on what percentage of time during a session includes no user activity on the user device (e.g., the user computing device 126). In general, a session with a higher percentage of inactivity periods is likely to have higher susceptibility of fraud due to risk of parallel usage of a different app, suspicious attacks, and any resource intensive background activity. For example, $P=P_O/P_T$, where $P_O$=period of no activity during a session and $P_T$=total session length.

Figure 4:
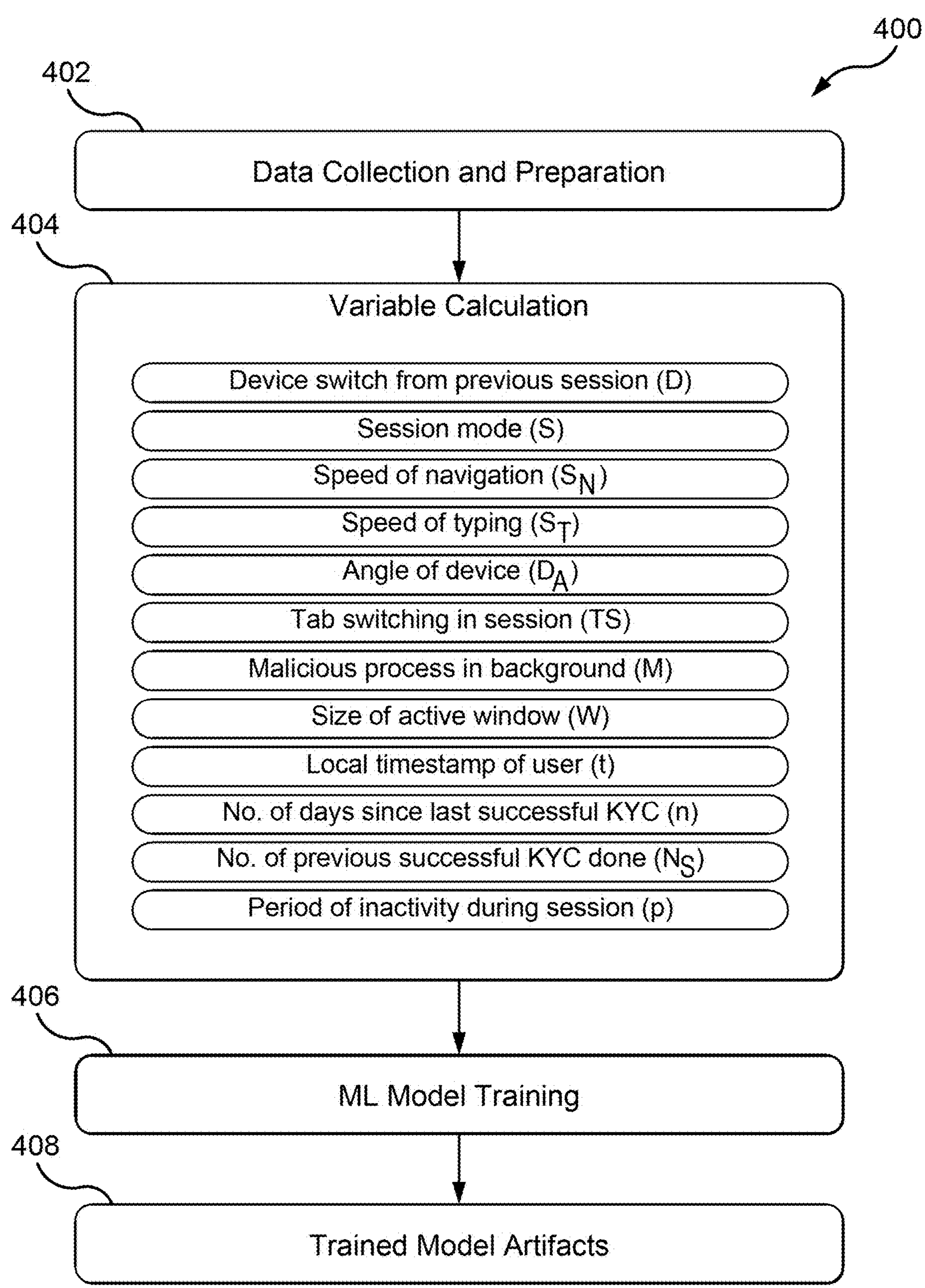
FIG. 4 is a flow chart depicting a training method for a machine learning (ML) model utilized by the user validation system of FIG. 1, in accordance with one or more embodiments of the present disclosure.
Figure 5:
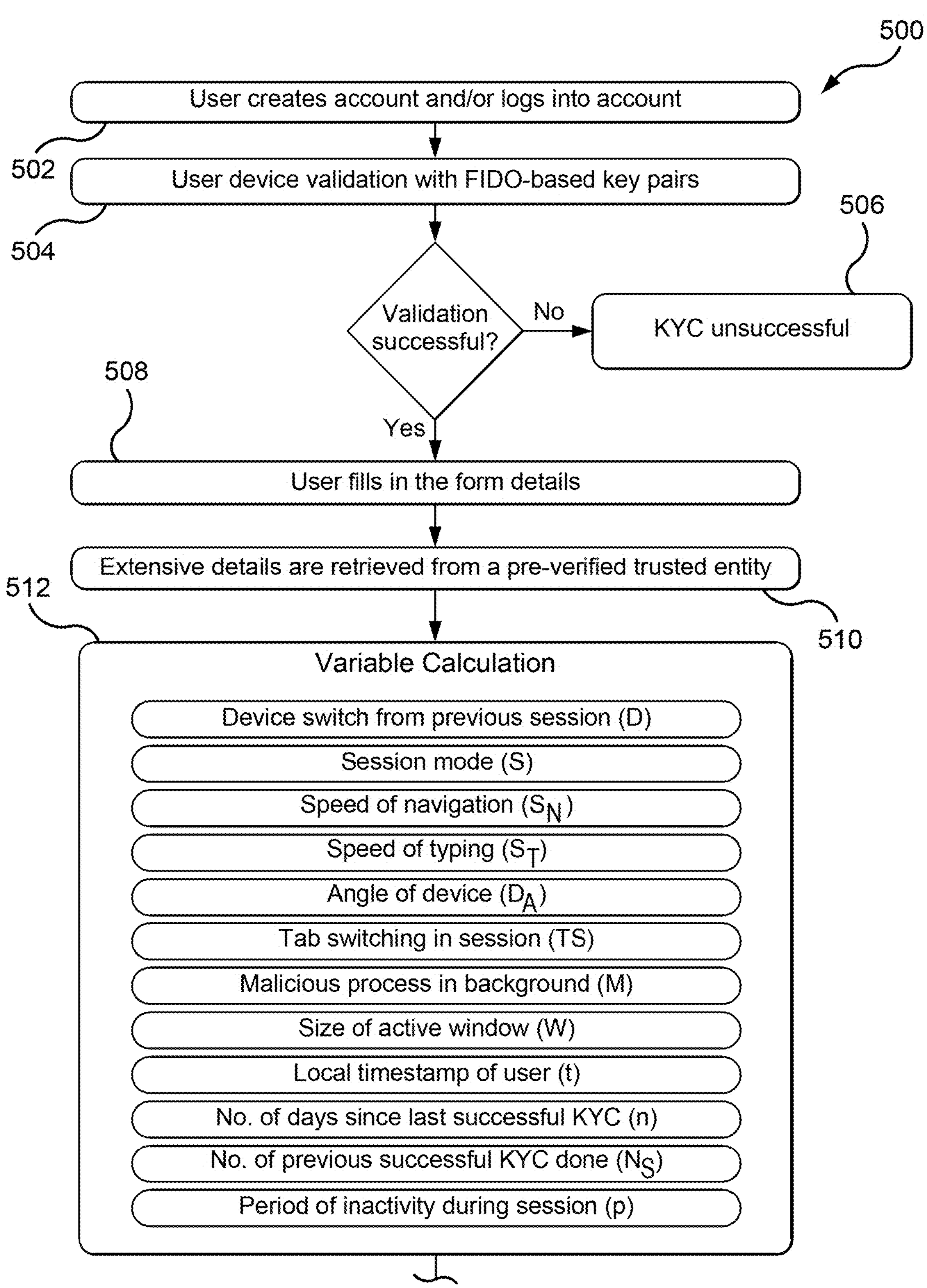
FIG. 5 is a flow chart depicting a user validation method in accordance with one or more embodiments of the present disclosure.
Figure 5:
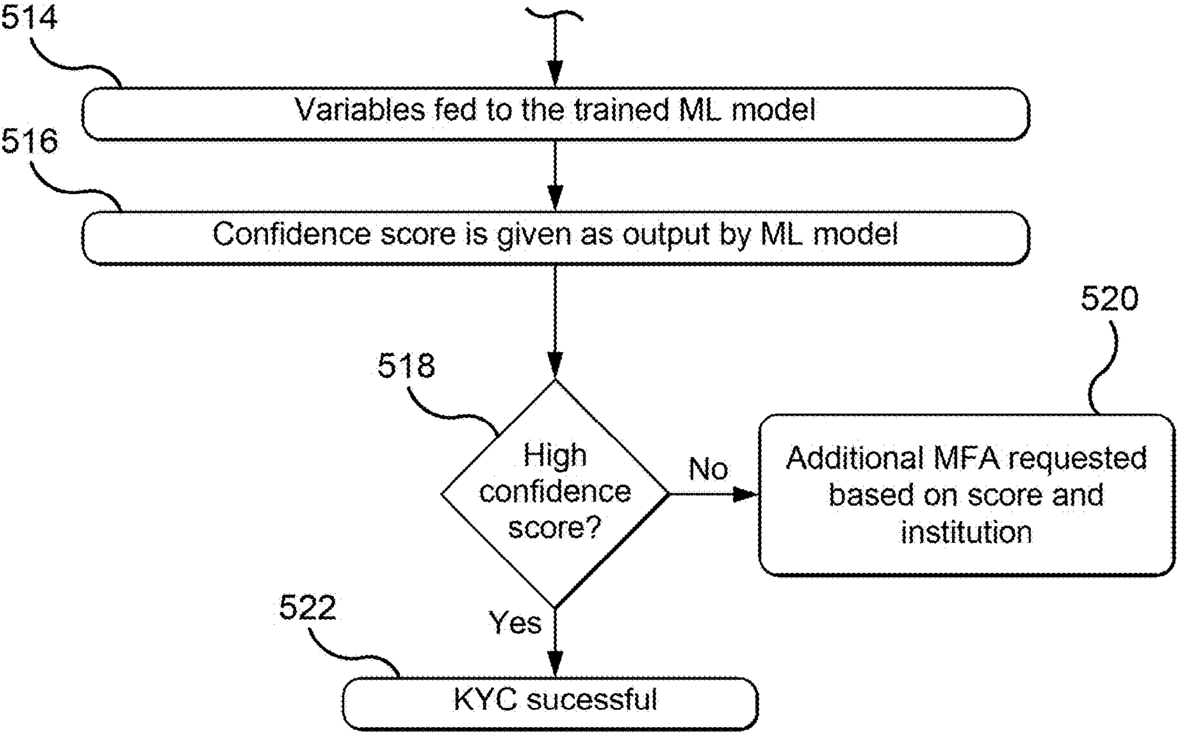

FIGS. 4-5 depict a flowchart illustrating an exemplary computer-implemented method 400 for training a model to be used for user validation and an exemplary computer-implemented method 500 for performing user validation using the ML model trained in method 500. The methods 400 and/or 500 described herein may additionally include features for verifying a user for various purposes, such as during a transaction process via a system, such as the system 100 (shown in FIG. 1), according to one aspect of the present invention. For example, credit card transactions between a merchant and a user may require user validation. In other example embodiments, concert venues or concert ticket sellers may require user validation or user verification to ensure that the user who purchased the tickets is the user attempting to use the tickets to get into the concert or event. In some embodiments, user validation or user verification operations as described herein may be tied in with banking apps or other such mobile apps. Additionally or alternatively, the user validation methods described herein can be used for user validation when access to any banking services or websites or government services or websites is requested via an electronic device or mobile electronic device, for example.

The operations described herein may be performed in the order shown in FIGS. 4-5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 400 is described below, for ease of reference, as being executed by exemplary devices and components introduced with the embodiments illustrated in FIGS. 1-3. In one or more embodiments, the computer-implemented method 400 is implemented by the system 100 (shown in FIG. 1) or one or more components thereof (e.g., systems 112 and/or 118 of the identity provider and/or identity verification provider 110, 116). Likewise, in one or more embodiments, the computer-implemented method 500 is implemented by the system 100 (shown in FIG. 1) or one or more components thereof. While operations within the computer implemented methods 400 and 500 are described below regarding the system 100, according to some aspects of the present invention, the computer-implemented methods 400 and/or 500 may be implemented using any other computing devices and/or systems of the system 100 through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the operations outlined herein. The program(s) stored on the computer-readable medium(s) may instruct the processor or processing units to perform additional, fewer, or alternative actions, including those discussed elsewhere herein.

Training Method

As depicted in FIG. 4, the method 400 for training a machine learning (ML) model may include the operations of collecting and/or preparing data, as depicted in block 402, and calculating and/or extracting variables based on the data, as depicted in block 404. Data collection may include collecting raw data from the user computing device 126 or other such user devices based on user activity or user behavior (e.g., behavioral biometrics) sensed by the user computing device 126 and/or based on usage thereof, and using that raw data as input and/or to calculate any of the variables described above or other such variables associated with an increased likelihood of deep fakes of fraudulent use.

For example, the variables calculated in block 404 may include one or more of the following variables as described in detail above: device switch from previous session (D), session mode(S), speed of navigation ($S_N$), speed of typing ($S_T$), angle of device ($D_A$), tab switching in session ($T_S$), malicious process in background (M), size of active window (W), local timestamp of user (T), number of days since last successful KYC (N), number of previous successful KYC done ($N_S$), and period of inactivity during session (P). These variables may be extracted and/or calculated using the methods or algorithms described above and/or using other calculating techniques using raw data obtained in block 402. It should also be noted that raw data and/or other feature computations may give rise to ML model training and/or runtime input without departing from the spirit of the present invention.

The method 400 further includes training the ML model, as in block 406. The training may include pattern recognition algorithms or machine learning analysis, such as those utilizing neural networks, decision trees, fuzzy logic, or any other machine learning models known in the art. In one or more embodiments, the ML model may be trained in a supervised or unsupervised manner, recursively, until a desired accuracy average is achieved. For example, some of the data collected may also reflect whether or not the user ended up being fraudulent, in addition to the various variables extracted and/or calculated in block 404, such that the ML model is taught correlations between the variables and/or combinations thereof (including in weighted combinations) on the one hand and indications of user validity or invalidity on the other hand.

The training performed in block 406 may use various weighting methods, algorithms, and/or ML training techniques known in the art. In one or more embodiments, the ML training may be supervised (e.g., adjusted based on labeled inputs, such as those generated by manual tagging, labeling, weighting, and the like by a human training the ML model, and/or those generated by automated labeling processes) or unsupervised (e.g., trained via recursion and automated methods). The ML model training may be performed by one or more of the processors described herein or any processor known in the art.

Weights can be assigned to parameters, features and/or variables based on statistical analysis and model performance. Although certain parameters may be expected to influence the model decision more than others, final values of weights may depend on a number of factors, including class imbalance of training dataset and selected ML model. For example, in some embodiments parameters with higher expected weight based on domain knowledge include: speed of navigation (Sx), speed of typing ($S_T$), angle of device ($D_A$), malicious process in background (M), and number of previous successful KYC done ($N_S$). Likewise, parameters with lower expected weight based on domain knowledge may include: device switch from previous session (D), session mode(S), tab switching in session ($T_S$), size of active window (W), local timestamp of user (T), number of days since last successful KYC (N), and period of inactivity during session (P). Influence of factors for each model inference can be gauged by number of model specifics as well as model agnostic methods, such as classification report (e.g., decision tree-based model), Local Interpretable Model-Agnostic Explanations (LIME), model-agnostic Shapley Additive explanations (SHAP), and/or other machine learning tools that help explain predictions of a block box model by approximating the model with a simpler, interpretable model.

The method 400 may also include outputting one or more trained ML models or trained model artifacts, as depicted in block 408. That is, once the ML model training results in a desired accuracy, the one or more model artifacts or ML models are ready for use in one or more of the methods described herein. "Trained model artifact" is a machine learning term that is used to describe the output created by the training process, such as the training noted above. Output could include a fully trained ML model, a model checkpoint, and/or a file created during the training process.

Method for User Validation

As depicted in FIG. 5, the method 500 for user validation may include an operation of a user creating and/or logging into an account online, as depicted in block 502. This may include opening an app on a smart phone or tablet, for example, or may include Web-based access via an Internet browser or the like. For example, the user 134 may initiate contact with a FIDO server, such as a server associated with the identity provider 110 via a communication link or the network 132 to enroll in a FIDO authentication system. This typically involves registering a biometric (like fingerprint or face scan) or a security key. For example, when the user 134 (e.g., a cardholder) has chosen a biometric, such as a fingerprint, as a FIDO authentication method for his or her payment card, the identity provider 110 generates a public/private key pair associated with the payment card of the user 134. The public key is sent to and stored on the FIDO server (e.g., the database 114). The private key, protected by the cardholder's biometric, remains in the secure memory of the user computing device 126.

The method 500 may also include an operation of validating a user device (e.g., the user computing device 126) with FIDO-based key pairs, as depicted in block 504, or other FIDO-based verification techniques. As described above, FIDO authentication protocols may establish secure key pairs for user devices, ensuring a strong foundation for user identification. Specifically, FIDO authentication may use public key cryptography to replace passwords with more secure methods, such as passkeys, biometrics, and physical security keys. Passkeys may include cryptographic key pairs that are stored on the user computing device 126 and/or the FIDO server. Biometrics can include fingerprints or facial recognition. Physical security keys can include smart cards or the like to authenticate users. To use FIDO authentication, a user-registered device such as the user computing device 126 is issued a private key that is unique to each application and stored into memory on the user computing device 126. For example, users can sign onto a FIDO-enabled product or service by providing a fingerprint, speaking into a microphone, looking into a camera, or entering a PIN, for example. When the cardholder or the user 134 authenticates himself or herself with the biometric, and the biometric is correct, the private key associated with the payment card is unlocked. The FIDO authentication request is digitally signed with the private key and sent to the FIDO server or the like where the digital signature is verified using the public key.

For example, the user computing device 126 may send a signal associated with the private FIDO key (e.g., the FIDO authentication request, digitally signed with the private key) to the identity provider 110. After the digital signature is verified using the public key, the FIDO server (or other servers of the identity provider 110) returns a response (e.g., FIDO attestation data). The FIDO attestation data may cryptographically protect the way elements of the system 100 can verify the data authenticity, integrity, and origin. In some embodiments, the user computing device 126 may also receive verification from the identity provider 110 that the private FIDO key and/or the digital signature associated therewith, corresponds to the public FIDO key stored in a memory device (e.g., database 114) of the identity provider 110.

If the FIDO-based validation is unsuccessful, the method 500 may include indicating that the user validation was unsuccessful, as in block 506. This may include a message to the user (e.g., sent by the identity provider 110 to the user computing device 126) and/or to other devices or systems within the system 100, such that unsuccessful KYC is reported to any necessary parties involved in a transaction, for example, and the transaction is cancelled and/or declined and not completed. For example, the identity provider 110, the consumer financial institution 120, or the user computing device 126 may communicate to the service provider 102 that the FIDO-based validation failed and the user has not been validated or verified. In some embodiments, the user computing device 126 receiving indication that the FIDO-based validation was unsuccessful causes one or more processors of the user computing device 126 to display an error alert on the display 220 and/or may prevent a fillable form from being filled out by the user, as described below.

In one or more embodiments, the method 500 may include an operation of prompting a user, via the user computing device 126 for example, to fill in form details of a provided form, as in block 508. The prompt and/or access to the fillable fields of the form may be predicated or dependent on successful FIDO-based validation. The form may request one or more answers or pieces of information or documents as required by the service provider, identity provider, identity verification provider, acquirer, consumer financial institution, issuer, or any other system or party associated with the transaction or user validation process described herein.

The form or one or more questions associated with the required or requested data to be provided by the user may be sent to the user computing device 126 and displayed thereon (e.g., via a display screen thereof), and the user computing device 126 may be configured to receive inputs to the form and/or the questions via a user interface of the user computing device 126. This data provided by the user may then be transmitted to the service provider, identity provider, identity verification provider, acquirer, consumer financial institution, issuer, or any other system or party associated with the transaction or user validation process described herein.

On the other hand, as described above, if the FIDO-based validation was unsuccessful, this may trigger the user computing device 126 to display an error alert on the display 220 and/or prevent the fillable form from being filled out by the user. That is, user validation may fail if the private FIDO key does not match the public FIDO key, which in some example embodiments may result in the fillable form not being provided to the user to be filled out or the user otherwise being prevented from filling out the fillable form. In other embodiments, if the FIDO-based validation is unsuccessful, this failed user validation may be indicated in other ways and/or follow others of the operations described herein without departing from the scope of the technology herein (such as following determination of the confidence score).

The method 500 may further comprise retrieving other relevant details from a pre-verified trusted entity, as depicted in block 510. For example, extensive details may be retrieved from a pre-verified trusted entity such as the consumer financial institution 120 or issuer, the acquirer, the service provider, the identity provider, or other databases storing information associated with the user 134. In some embodiments, this operation may include, for example, a financial institution or issuer providing verification that an account associated with a user is in good standing, for example, or that the account has not be reported as compromised (e.g., suspended based on a fraud alert or the like). However, the operation in block 510 may be omitted without departing from the scope of the methods described herein.

The method 500 may also comprise an operation of extracting and/or calculating one or more variables, as depicted in block 512. These variables may be received from and associated with the user computing device 126, such as behavioral biometrics (as described above) and/or other activities or processes being performed thereby. For example, the variables may include one or more of the following variables as described in detail above: device switch from previous session (D), session mode(S), speed of navigation ($S_N$), speed of typing ($S_T$), angle of device ($D_A$), tab switching in session ($T_S$), malicious process in background (M), size of active window (W), local timestamp of user (T), number of days since last successful KYC (N), number of previous successful KYC done ($N_S$), and period of inactivity during session (P). These variables may be extracted, derived and/or calculated based on actions taken during filling out the form, for example, or during a given time period during and/or before or after a transaction and/or form-filling operation takes place and/or a user validation is requested. This calculating operation depicted in block 512 may be performed via the user computing device 126, the identity provider 110 or processors thereof, or any other processors depicted and described herein.

The method 500 may also include an operation of outputting and/or feeding the variables into the trained ML model, as depicted in block 514. The trained ML model may output a confidence score, as depicted in block 516. The trained ML model may be the ML model trained in the operations of method 400, as described above and depicted in FIG. 4. However, other ML models may be used without departing from the scope of the technology described herein. Additionally or alternatively, the ML model may be replaced with a plurality of weighting algorithms or other pre-programmed weighting computer code configured to output the confidence score.

Furthermore, it should be noted that during application of the trained ML model, safeguards may be implemented such that any statistically significantly high deviations from specific user interaction is "soft labeled" as fraud, and a final decision can be made after the success or failure results of the user validation is determined, such that this data can be used for additional training of the ML model (e.g., via supervised training described above) to assist in future user validation methods. These updates to the trained ML model may occur at pre-determined regular intervals or may be pushed out whenever an entity training the ML models determines that an update is needed.

The method 500 may include determining if the confidence score meets one or more validation criteria, as in block 518. In one or more embodiments, the one or more criteria include a threshold, and the confidence score may be of variable value with higher values correlating to high likelihood of authenticity and lower likelihood of fraud. For example, a confidence score may be above or below a desired threshold. In some embodiments, the threshold may be adjusted based on risk tolerance for different uses of the user validation process. Additionally or alternatively, the threshold may include a range of acceptable confidence scores, a range of unacceptable confidence scores, and a range of confidence scores that need further information or action by a user in order to validate or verify the user. If the confidence score is not high enough, the method may include, for example, requesting additional multifactor authentication (MFA) data to proceed, as depicted in block 520. For example, in-person verification may be requested for exceptionally low confidence scores, and three-step verification may be required for low to moderate confidence scores. This additional action by or information from the user may be requested via the display 220. Additionally or alternatively, the user computing device 126 and/or the system 112 of the identity provider 110 may send a notification to computing system 104 of the service provider 102 indicating that a transaction is declined when the confidence score is below the threshold. As described above, in some embodiments, validation additionally or alternatively fails if the private FIDO key does not match the public FIDO key. Determination of FIDO validation failure may occur at any point during the operations described herein, such as before the filling out of the form by the user or after the confidence score is determined. For example, in some embodiments, the form is not provided to the user to be filled out if validation has failed due to the private FIDO key not matching the public FIDO key.

On the other hand, if the confidence score is high enough (e.g., above the threshold), approval may be sent to one or more of the devices or systems in the system 100 indicating that the user is validated or verified, as depicted in block 522. That is, the user computing device 126 and/or the system 112 of the identity provider 110 may indicate to the user 134 (e.g., via the display 220), the service provider 102, the acquirer 106, the consumer financial institution 120, the issuer, or any other system or party associated with the transaction or user validation process described herein that the user is a valid, verified user based on this confidence score. This validation of the user may then allow one or more of these systems to output approval to one or more of the other devices or systems described herein. The approval may be in the form of an authentication code for a transaction, access to a financial account, approval of an individual purchasing tickets or attempting to attend an event with tickets they previously purchased, or any other activity in which a user's identity is required to be validated in order to proceed.

It should be noted that the confidence score output by the ML model may be other than a scaled score, and that the one or more criteria may be other than a threshold, without departing from the spirit of the present invention. For example, in one or more embodiments, the ML model may comprise a neural network, and the output layer may output a classification (e.g., "fraudulent" or "not fraudulent") and/or an output vector which may, in turn, be submitted to a decisioning algorithm (e.g., comprising a decision tree) for determination on whether further information is required, a transaction should be declined, or a transaction should be approved. One of ordinary skill will appreciate that a variety of confidence score outputs and/or validation criteria are within the scope of the present invention.

Throughout this specification, references to "one embodiment", "one or more embodiments", or "embodiments" mean that the feature or features being referred to are included in at least one or more embodiments of the technology. Separate references to "one embodiment", "one or more embodiments", or "embodiments" in this description do not necessarily refer to the same embodiment and are also not mutually exclusive unless so stated and/or except as will be readily apparent to those skilled in the art from the description. For example, a feature, structure, act, etc. described in one or more embodiments may also be included in other embodiments, but is not necessarily included. Thus, the current invention can include a variety of combinations and/or integrations of the embodiments described herein.

Additional Considerations

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A system for user validation, the system comprising:
- a computing device of an identity provider including at least one processor and at least one memory device, wherein the identity provider computing device is communicably coupled with a user computing device associated with a user, the identity provider computing device configured to:
  - receive a signal associated with a private Fast Identity Online (FIDO) key from the user computing device;
  - verify that the signal associated with the private FIDO key corresponds to a public FIDO key stored in the at least one memory device of the identity provider computing device;
  - receive data regarding behavioral biometrics sensed by the user computing device;
  - input one or more variables based on the received data into a trained machine learning (ML) model configured to output a confidence score based on the one or more variables, wherein the ML model is at least partially trained on data from in-person know your customer (KYC) onboarding processes and collection of meta data therefrom;
  - determine if the confidence score satisfies one or more validation criteria; and
  - based on the determination, output to at least one of the user computing device and a computing system of a service provider a notification of whether the user is fraudulent.

2. The system of claim 1, wherein—the determination is that the confidence score does not satisfy the one or more validation criteria, the notification is to the user computing device, the notification includes a request for additional action by or information from the user.

3. The system of claim 1, wherein—the determination is that the confidence score does not satisfy the one or more validation criteria, the notification is to the computing system of the service provider, the notification comprises notice that a transaction is declined.

4. The system of claim 1, wherein the one or more variables comprise at least two of: speed of navigation (SN), speed of typing (ST), angle of device (DA), malicious process in background (M), and number of previous successful user validations (Ns).

5. The system of claim 1, wherein the one or more variables comprise at least two of: device switch from previous session (D), session mode(S), tab switching in session (Ts), size of active window (W), local timestamp of user (T), number of days since last successful user validations (N), and period of inactivity during session (P).

6. The system of claim 1, wherein the trained ML model weights each of the one or more variables based on an extent to which each of the one or more variables is indicative of fraudulent activity.

7. The system of claim 1, wherein the private FIDO key is associated with biometric authentication from the user via the user computing device.

8. The system of claim 1, wherein one or more of the behavioral biometrics are sensed while the user is inputting information into a form on the user computing device.

9. A user computing device for user validation with a service provider, the user computing device comprising:

a display screen;

an input device configured to receive input from a user;

at least one memory device; and one or more processors configured and programmed to individually or collectively:

send a signal associated with a private Fast Identity Online (FIDO) key to an identity provider computing device for comparison by the identity provider computing device against a public FIDO key;

receive an indication that the private FIDO key corresponds to the public FIDO key;

provide a fillable form on the display screen in response to receiving an indication that the private FIDO key corresponds to the public FIDO key;

receive behavioral biometric data sensed as the user fills out the fillable form via the input device;

output one or more variables based on the behavioral biometric data to a trained machine learning (ML) model configured to output a confidence score based on the one or more variables; and display on the display screen a validation determination of whether the user is considered fraudulent based on evaluation of the confidence score using one or more validation criteria.

10. The user computing device of claim 9, wherein the validation determination is negative and based on the negative determination the one or more processors are configured and programmed to individually or collectively perform one of the following: (a) display on the display a request for additional action by or information from the user, or (b) send a notification to a computing system of the service provider that a transaction is declined.

11. The user computing device of claim 9, wherein the behavioral biometric data or the one or more variables comprise at least two of: speed of navigation (SN), speed of typing (ST), angle of device (DA), malicious process in background (M), number of previous successful user validations (Ns), device switch from previous session (D), session mode(S), tab switching in session (Ts), size of active window (W), local timestamp of user (T), number of days since last successful user validations (N), and period of inactivity during session (P).

12. The user computing device of claim 9, wherein the private FIDO key is associated with biometric authentication from the user via the user computing device.

13. The user computing device of claim 9, wherein the validation determination is negative and includes an indication from the identity provider computing device that the private FIDO key does not correspond to the public FIDO key.

14. The user computing device of claim 9, wherein the one or more processors are configured to receive verification from the identity provider that the private FIDO key corresponds to the public FIDO key, the receipt of the behavioral data from the user being enabled based on the verification of the private FIDO key.

15. Non-transitory computer-readable storage media having computer-executable instructions for user validation, wherein when executed by at least one processor, the computer-executable instructions cause the at least one processor to:

validate a user computing device via FIDO-based key pairs by verifying that the private FIDO key corresponds to a public FIDO key;

receive from the user computing device details input by a user into a form on the user computing device in response to verifying that the private FIDO key corresponds to the public FIDO key;

receive data regarding behavioral biometrics sensed by the user computing device, wherein at least some of the behavioral biometrics are sensed as the user inputs the details into the form;

determine a confidence score based on the behavioral biometrics data; and output to at least one of the user computing device and a computing system of a service provider a validation determination of whether the user is fraudulent based on comparison of the confidence score against one or more validation criteria.

16. The non-transitory computer-readable storage media of claim 15, wherein the computer-executable instructions cause the at least one processor to input variables based on the behavioral biometrics data into a trained machine learning (ML) model configured to output the confidence score, wherein the trained ML model is trained to weigh each of the variables based on an extent to which each of the variables is indicative of fraudulent activity, wherein the ML model is at least partially trained on data from in-person know your customer (KYC) onboarding processes and collection of meta data therefrom.

17. The non-transitory computer-readable storage media of claim 15, wherein the validation determination is that the confidence score does not satisfy the one or more validation criteria, the notification is sent to the user computing device, and the notification includes a request for additional action by or information from the user.

18. The non-transitory computer-readable storage media of claim 15, wherein the validation determination is that the confidence score does not satisfy the one or more validation criteria, the notification is sent to the computing device of the service provider, and the notification comprises notice that a transaction is declined.

19. The non-transitory computer-readable storage media of claim 15, wherein the one or more variables comprise at least two of: speed of navigation (SN), speed of typing (ST), angle of device (DA), malicious process in background (M), and number of previous successful user validations (Ns).

20. The non-transitory computer-readable storage media of claim 15, wherein the one or more variables comprise the number of times tab switching occurs in a form filling session (Ts) and speed of navigation ($S_N$) being higher or lower than a given deviation from a standard time difference for navigating between given consecutive fields.

* * * * *